US012132660B2

(12) United States Patent
Sundararajan et al.

(10) Patent No.: US 12,132,660 B2
(45) Date of Patent: Oct. 29, 2024

(54) SYSTEMS AND METHODS FOR HANDLING ASYMMETRIC SDWAN TRAFFIC FLOWS

(71) Applicant: Cisco Technology, Inc., San Jose, CA (US)

(72) Inventors: Balaji Sundararajan, Fremont, CA (US); Srilatha Tangirala, San Jose, CA (US); Ajeet Pal Singh Gill, Fremont, CA (US); Vivek Agarwal, Campbell, CA (US); Nithin Bangalore Raju, Saratoga, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 381 days.

(21) Appl. No.: 17/718,775

(22) Filed: Apr. 12, 2022

(65) Prior Publication Data

US 2023/0327994 A1    Oct. 12, 2023

(51) Int. Cl.
*H04L 47/20*        (2022.01)
*H04L 69/16*        (2022.01)

(52) U.S. Cl.
CPC .............. *H04L 47/20* (2013.01); *H04L 69/16* (2013.01)

(58) Field of Classification Search
CPC ................................ H04L 47/20; H04L 69/16
See application file for complete search history.

(56) References Cited

U.S. PATENT DOCUMENTS

| | | | |
|---|---|---|---|
| 11,991,211 B1 * | 5/2024 | Gangur | ................... H04L 63/20 |
| 2008/0240115 A1 | 10/2008 | Briscoe et al. | |
| 2016/0261486 A1 | 9/2016 | Fang et al. | |
| 2019/0104050 A1 | 4/2019 | Cidon et al. | |
| 2021/0306261 A1 | 9/2021 | Duan et al. | |
| 2022/0006756 A1 | 1/2022 | Ramaswamy et al. | |
| 2022/0353196 A1 * | 11/2022 | Barton | .................... H04L 47/56 |
| 2023/0096862 A1 * | 3/2023 | Wighe | .................... H04L 45/02 |
| | | | 370/395.53 |
| 2024/0129232 A1 * | 4/2024 | Cheung | ............... H04L 63/0209 |

OTHER PUBLICATIONS

Cisco: "Cisco SD-WAN Design Guide", Cisco Public, Sep. 1, 2020, p. 5-p. 26, p. 41-p. 89, XP093028951, pp. 1-102.
International Search Report and Written Opinion for International Application No. PCT/US2023/017063, mailed Jul. 18, 2023, 14 Pages.
"Asymmetric Routing," Mar. 12, 2021, Contributed by Handle Asymmetry in Citrix SD-WAN WANOP Network.

* cited by examiner

*Primary Examiner* — Zhiren Qin
(74) *Attorney, Agent, or Firm* — Baker Botts L.L.P.

(57) ABSTRACT

According to certain embodiments, a method by a network device includes receiving a handshake message for a traffic flow from a Software-Defined Wide-Area Network (SD-WAN) and determining, from a traffic policy, whether the traffic flow should be symmetrical. In response to determining from the traffic policy that the traffic flow should be symmetrical, the method further includes performing a flow lookup on the traffic flow to determine if the network device originated the traffic flow. In response to determining that the network device did not originate the traffic flow, the method further includes determining a second network device that originated the traffic flow and sending the handshake message for the traffic flow to the second network device in order to maintain symmetry for the traffic flow.

20 Claims, 3 Drawing Sheets

SYSTEMS AND METHODS FOR HANDLING ASYMMETRIC SDWAN TRAFFIC FLOWS

TECHNICAL FIELD

The present disclosure generally relates to Software-Defined Wide-Area Networks (SDWANs), and more specifically to systems and methods for handling asymmetric SDWAN traffic flows.

BACKGROUND

Common network services such as firewalls, intrusion detection and prevention, server load balancing, and application visibility tools require symmetrical traffic flows wherein network packets leave and arrive via the same path. In some applications, such as cloud and large data centers, maintaining directional symmetry of a traffic flow is a challenge. Network congestion, packet loss, unexpected load balancing, and the unpredictable nature of an internet path all contribute to undesirable asymmetrical traffic flows where network packets leave and arrive through different paths.

DESCRIPTION OF EXAMPLE EMBODIMENTS

Overview

Figure 1:
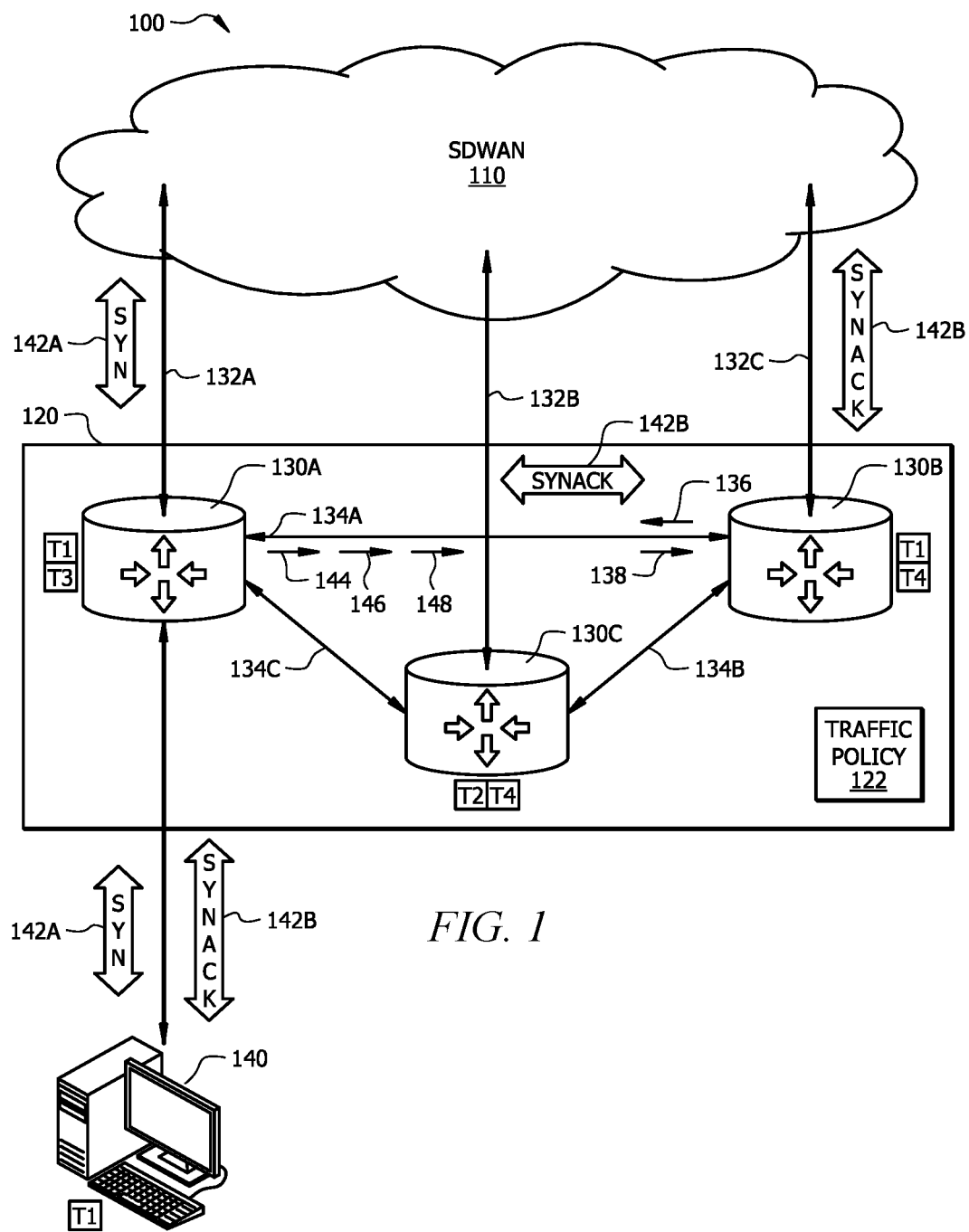
FIG. 1 illustrates an example of a system that provides handling of asymmetric SDWAN traffic flows, in accordance with certain embodiments.

According to certain embodiments, a network device includes one or more processors and one or more computer-readable non-transitory storage media. The one or more computer-readable non-transitory storage media includes instructions that, when executed by the one or more processors, cause one or more components of the network device to perform operations including receiving a handshake message for a traffic flow from a Software-Defined Wide-Area Network (SDWAN) and determining, from a traffic policy, whether the traffic flow should be symmetrical. The operations further include performing, in response to determining from the traffic policy that the traffic flow should be symmetrical, a flow lookup on the traffic flow to determine if the network device originated the traffic flow. The operations further include determining, in response to determining that the network device did not originate the traffic flow, a second network device that originated the traffic flow. The operations further include sending the handshake message for the traffic flow to the second network device in order to maintain symmetry for the traffic flow.

According to certain embodiments, a method by a network device includes receiving a handshake message for a traffic flow from a Software-Defined Wide-Area Network (SDWAN) and determining, from a traffic policy, whether the traffic flow should be symmetrical. In response to determining from the traffic policy that the traffic flow should be symmetrical, the method further includes performing a flow lookup on the traffic flow to determine if the network device originated the traffic flow. In response to determining that the network device did not originate the traffic flow, the method further includes determining a second network device that originated the traffic flow and sending the handshake message for the traffic flow to the second network device in order to maintain symmetry for the traffic flow Technical advantages of certain embodiments of this disclosure may include one or more of the following. Certain systems and methods described herein provide systems and methods for handling asymmetric SDWAN traffic flows. To do so, the disclosed embodiments provide network devices such as Multi-Tenant (MT) gateways that exchange flow messages in order to dynamically react to flow asymmetry without requiring a change to any network infrastructure or using Source Network Address Translation (SNAT) for statefully maintaining traffic flows. More specifically, when a MT gateway receives a handshake message such as a Transmission Control Protocol (TCP) SYN-ACK message for a specific tenant, it will check the traffic policy for that tenant to determine if the flow should be symmetrical. If the flow is identified as a symmetric flow, the MT gateway will perform a flow lookup and then redirect the handshake message to another MT gateway in the same tenancy that originated or is otherwise currently holding onto the traffic flow. As a result, symmetry is maintained for the traffic flow, thereby avoiding problems associated with asymmetric traffic flow (e.g., problems with applications such as firewalls, intrusion detection and prevention, server load balancing, and application visibility tools that require symmetrical traffic flows). These and other features of the disclosed embodiments thereby reduce or eliminate network asymmetry, network bandwidth, and computer resource requirements (e.g., computer memory and processing power) that would otherwise be required by asymmetric traffic flows. Other technical advantages will be readily apparent to one skilled in the art from the following figures, descriptions, and claims. Moreover, while specific advantages have been enumerated above, various embodiments may include all, some, or none of the enumerated advantages.

Example Embodiments

Embodiments of this disclosure provide systems and methods for handling asymmetric SDWAN traffic flows. To do so, the disclosed embodiments provide network devices such as MT gateways that exchange flow messages in order to dynamically react to flow asymmetry without requiring a change to any network infrastructure or using SNAT for statefully maintaining traffic flows. More specifically, when a MT gateway receives a handshake message such as a TCP SYN-ACK message for a specific tenant, it will check the traffic policy for that tenant to determine if the flow should be symmetrical. If the flow is identified as a symmetric flow, the MT gateway will perform a flow lookup and then redirect the handshake message to another MT gateway in the same tenancy that originated the traffic flow. As a result, symmetry is maintained for the traffic flow, thereby avoiding problems associated with asymmetric traffic flow (e.g., problems with applications such as firewalls, intrusion detection and prevention, server load balancing, and application visibility tools that require symmetrical traffic flows).

FIG. 1 illustrates an example of asymmetric flow handling system 100 that handles asymmetric SDWAN traffic flows. Asymmetric flow handling system 100 may include a SDWAN 110 and a data center/computing cloud 120. Data center/computing cloud 120 includes multiple network devices 130 (e.g., 130A-C) that are each communicatively coupled to SDWAN 110 via a tunnel 132 (e.g., 132A-C) and are communicatively coupled to each other via GRE tunnels 134A-C. Each network device 130 is communicatively coupled to one or more remote users 140. For purposes of example and explanation, FIG. 1 shows certain connections between certain components (such as connections between network devices 130). However, FIG. 1 does not imply a particular physical topology as the connections may be made via the cloud.

In general, SDWAN 110 may be an underlay network that supports a virtual overlay network. An underlay network may include, for example, all or a portion of: the Internet, one or more Internet Protocol (IP) networks (such as one or more IP Security, IPsec, networks), one or more Multiprotocol Label Switching (MPLS) networks, one or more cellular network(s), and/or other suitable networks. In certain embodiments, the virtual overlay network may include data plane connections/tunnels that carry traffic between components of the SDWAN. As an example, the virtual overlay network may include Internet Protocol Security (IPsec) tunnels that carry traffic between components of the SDWAN. In certain embodiments, the virtual overlay network may carry traffic between a plurality of sites (including, for example, a first site A and a second site B) over the underlay network. Each site may connect to the network via one or more WAN-edge routers.

Network device 130 is any router, gateway, or other device of data center/computing cloud 120 that handles traffic flows. In some embodiments, each network device 130 is an MT gateway that is assigned to one or more tenants of data center/computing cloud 120. For example, as illustrated in FIG. 1, network device 130A may handle traffic for tenants T1 and T3, network device 130B may handle traffic for tenants T1 and T4, and network device 130C may handle traffic for tenants T2 and T4. While a specific number of network devices 130 and tenants are illustrated in FIG. 1, asymmetric flow handling system 100 may have any number of network devices 130 and tenants.

Handshake messages 142A-B are communication messages sent between remote users 140, network devices 130, and SDWAN 110. In some embodiments, handshake messages 142 are messages that are exchanged in order to establish a traffic flow. In some embodiments, handshake message 142A is a TCP SYN message and handshake message 142B is a TCP SYN-ACK message. In general, remote user 140 sends handshake message 142A in order to establish a communications sessions (e.g., a TCP session). Network device 130A sends the handshake message 142A from remote user 140 to SDWAN 110. SDWAN 110 then sends handshake message 142B back to data center/computing cloud 120 for receipt by remote user 140. If handshake message 142B is sent by SDWAN 110 to network device 130A, the traffic flow for remote user 140 will be a symmetrical traffic flow (e.g., the traffic flow leaves and arrives on the same network device 130A). However, if handshake message 142B arrives at a different network device 130 (e.g., network device 130B as illustrated in FIG. 1), the traffic flow for remote user 140 would be an asymmetrical traffic flow. This may be undesirable for certain applications. However, as described in more detail below, network device 130B will forward handshake message 142B to network device 130A in order to maintain symmetry on the traffic flow for remote user 140 if traffic policy 122 indicates that the traffic flow should be symmetrical.

Flow-add message 144 is a message that is sent by a network device 130 to other network devices 130 within data center/computing cloud 120 in order to inform the other network devices 130 of a flow state addition. For example, once network device 130A receives handshake message 142A from remote user 140 of tenant T1, network device 130A may determine from traffic policy 122 whether the traffic flow from remote user 140 should be symmetrical (e.g., whether traffic of tenant T1 should be symmetrical). If network device 130A determines that the traffic flow from remote user 140 should be symmetrical, network device 130A in some embodiments sends flow-add message 144 to all other network devices 130 in data center/computing cloud 120 under the same tenancy (e.g., all other network devices 130 that are handling traffic flows for tenant T1). In the example of FIG. 1, network device 130A sends flow-add message 144 to network device 130B since it is also handling traffic for tenant T1 but avoids sending flow-add message 144 to network device 130C since network device 130C is not handling traffic for tenant T1. In some embodiments, flow-add message 144 includes an indication of an application protocol of the traffic flow from remote user 140 (e.g., HTTP, FTP, Telnet, etc.). In some embodiments, flow-add message 144 includes an op code of "Flow-Add" in a header of flow-add message 144. In some embodiments, flow-add message 144 is sent to other network devices 130 across GRE tunnels 134 (e.g., GRE tunnel 134A in the example of FIG. 1).

While a traffic flow session for a connection is active and traffic is passing (e.g., to remote user 140), a network device 130 that is holding onto the traffic flow may send a flow-update message 146 to other network devices 130 in data center/computing cloud 120 in order to confirm that the connection is still active and that redirection should continue. In some embodiments, flow-update message 146 is sent to all other network devices 130 in the same tenancy. In some embodiments, flow-update message 146 is sent periodically (e.g., every two minutes). As illustrated in FIG. 1, for example, network device 130A may periodically send flow-add message 144 across GRE tunnel 134A to network device 130B since network devices 130A-B are both in the same tenancy (e.g., tenant T1). In this way, network device 130A may periodically inform network device 130B that network device 130A is still holding onto the traffic flow for remote user 140 and that network device 130B should continue to redirect any handshake messages 142B for remote user 140 to network device 130A.

When a connection is closed by a client (e.g., remote user 140), the network device 130 that was handling the traffic flow for the client may send a flow-delete message 148 to other network devices 130 in data center/computing cloud 120 in order to confirm that the connection is closed, that any flow entries for the connection should be cleared, and that redirection should not continue. In some embodiments, flow-delete message 148 is sent to all other network devices 130 in the same tenancy. As illustrated in FIG. 1, for example, network device 130A may send flow-delete message 148 across GRE tunnel 134A to network device 130B since network devices 130A-B are both in the same tenancy (e.g., tenant T1). In this way, network device 130A may inform network device 130B that network device 130A is no longer handling the traffic flow for remote user 140 and that network device 130B should no longer redirect any handshake messages 142B for remote user 140 to network device 130A.

In some embodiments, network device 130 may automatically delete a flow entry even if a flow-delete message 148 is not received. For example, if network device 130B determines that the traffic flow for remote user 140 that is being handled by network device 130A has a time stamp that is greater than a certain amount of time (e.g., ten minutes) and no flow-update messages 146 have been received from network device 130A for a certain amount of consecutive times (e.g., five times), network device 130B may automatically delete the flow entry for remote user 140 and no longer redirect any handshake messages 142B for remote user 140 to network device 130A.

In operation, asymmetric flow handling system 100 identifies asymmetric traffic flows for SDWAN 110 and takes actions to convert any asymmetric flow to a symmetric flow when traffic policy 122 indicates that the flow should be symmetric. As used herein, a symmetric traffic flow is any traffic flow that is sent to SDWAN 110 and arrives from SDWAN 110 on the same network device 130 (e.g., leaves from network device 130A and arrives back at network device 130A from SDWAN 110). Likewise, an asymmetric traffic flow is any traffic flow that is sent to SDWAN 110 from a particular network device 130 but arrives from SDWAN 110 on a different network device 130 (e.g., leaves from network device 130A and arrives back at network device 130B from SDWAN 110). To provide asymmetric SDWAN traffic flow handling, a network device 130 such as network device 130B may receive a handshake message 142B for a traffic flow from SDWAN 110. In some embodiments, handshake message 142B may be a TCP SYN-ACK message that is sent by SDWAN 110 in response to receiving a handshake message 142A (e.g., a TCP SYN message) from remote user 140 via network device 130A.

After receiving handshake message 142B, network device 130B may determine, from traffic policy 122 (e.g., on a vSmart controller), whether the traffic flow associated with the received handshake message 142B should be symmetrical. As a specific example, traffic policy 122 may indicate whether or not the traffic of each tenant of data center/computing cloud 120 should be symmetrical (e.g., tenant T1=symmetrical traffic required; tenants T2–4=symmetrical traffic note required). Network device 130 may determine the tenancy of the traffic flow associated with the received handshake message 142B and then determine from traffic policy 122 whether the tenant should have symmetric flows. In this specific example, handshake message 142B is associated with tenant T1, which the example traffic policy 122 above indicates should have symmetric flows. Thus, network device 130B determines that the traffic flow associated with the received handshake message 142B should be symmetrical.

Once network device 130B determines that the traffic flow associated with the received handshake message 142B should be symmetrical, network device 130B then performs a flow lookup on the traffic flow associated with the received handshake message 142B in order to determine if network device 130B originated the traffic flow. For example, network device 130B may look up in its cache to determine if a Flow Entry exists for the traffic flow that indicates that network device 130B is handling the traffic flow associated with the received handshake message 142B. If network device 130B determines that it did not originate the traffic flow associated with handshake message 142B (e.g., there is no Flow Entry for the traffic flow or a Flow Entry for the traffic flow indicates that another network device 130 is handling the traffic flow), network device 130B determines which other network device 130 originated the traffic flow. If a Flow Entry for the traffic flow exists in the cache of network device 130B (e.g, a Flow Entry due to network device 130B learning directly from a traffic flow or from receiving a flow-add message 144), network device 130B may simply examine the Flow Entry for the traffic flow to determine which other network device 130 originated the traffic flow. If there is no Flow Entry for the traffic flow, network device 130B may send a flow query message 136 to other network devices 130 in the same tenancy of data center/computing cloud 120 in order to inquire and to determine which other network device 130 originated the traffic flow. In some embodiments, flow query message 136 is sent on a SYN-ACK Data Plane packet. If network device 130B receives a flow query response message 138 from a particular network device 130 (e.g., from network device 130A in the example of FIG. 1), network device 130B will determine that the particular network device 130 that sent the flow query response message 138 is handling the traffic flow associated with the received handshake message 142B and proceed to redirect flows to the particular network device 130 that sent the flow query response message 138. For example, a network device 130 that receives query message 136 searches for a flow entry identified using primarily using the SYN-ACK Data Plane packet. If a flow entry is found, the receiving network device 130 populates the response information and sends query response message 138 to the originating network device 130 (e.g., network device 130B in this example) in order to keep the flow symmetry. If the flow entry is not found, the receiving network device does not send query response message 138 back to network device 130B.

Once network device 130B determines that network device 130A originated the traffic flow associated with handshake message 142B, network device 130B sends handshake message 142B (e.g., SYN-ACK) for the traffic flow to network device 130B in order to maintain symmetry for the traffic flow. Network device 130A in turn sends handshake message 142B to remote user 140, thereby establishing the traffic flow for remote user 140. In some embodiments, sending the handshake message 142B to network device 130A includes network device 130B forwarding the handshake message 142B from SDWAN 110 across GRE tunnel 134A.

In addition to forwarding handshake message 142B to network device 130A once an asymmetric traffic flow is detected by network device 130B, network device 130B may also send an alert of the asymmetric traffic flow. For example, network device 130B may communicate with a controller about the asymmetric traffic flow that in turn sends or displays an alert on a graphical user interface to a user. Furthermore, an egress flow next-hop may be changed to point to the network device 130 that originally has the state for the connection in order to keep the flow symmetry. For example, when a flow is received by network device 130B, it may check if it has seen the flow before. If network device 130B determines that it did not handle the flow before, it may forward the packet to the router that handled the flow previously. If that flow is not found in the flow table of any router, then it is not processed, and it is sent to destination directly.

Figure 2:
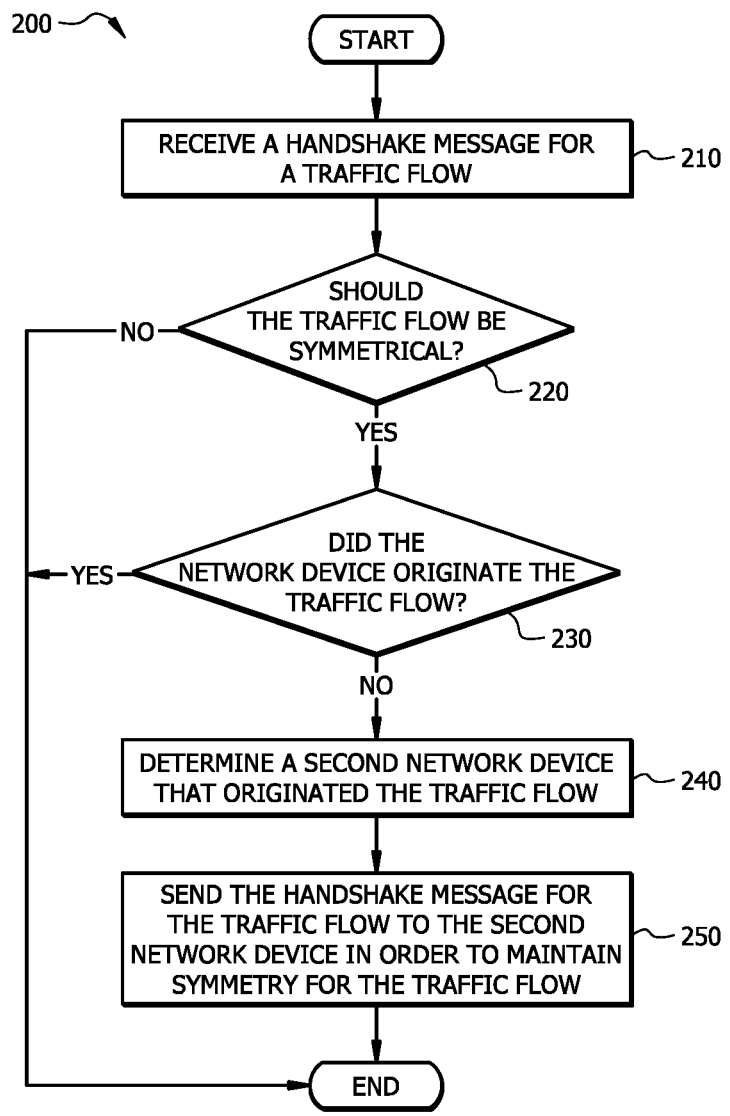
FIG. 2 illustrates an example of a method for providing handling of asymmetric SDWAN traffic flows, in accordance with certain embodiments.

FIG. 2 is a flow diagram illustrating an example method 200 by a network device. For example, method 200 may be performed by network device 130 such as an MT Gateway in asymmetric flow handling system 100. Method 200 may begin in step 210 where method 200 receives a handshake message for a traffic flow from a SDWAN. In some embodiments, the handshake message is handshake message 142B and is a TCP SYN-ACK message. In some embodiments, the traffic flow is for a particular remote user 140 in a particular tenancy (e.g., T1). After step 210, method 200 proceeds to step 220.

In step 220, method 200 determines, from a traffic policy, whether the traffic flow of step 210 should be symmetrical. In some embodiments, the traffic policy is traffic policy 122 and indicates, on a per-tenancy basis, whether traffic flows should be symmetrical. In some embodiments, step 220 includes comparing the tenant of the traffic flow of step 210 to the tenants in the traffic policy. If method 200 determines in step 220 that the received traffic flow should be symmetrical, method 200 proceeds to step 230. Otherwise, if method 200 determines in step 220 that the received traffic flow should not be symmetrical, method 200 may end.

In step 230, method 200 determines if the network device originated or is currently holding onto the traffic flow of step 210. In some embodiments, step 230 includes examining cache to determine if a Flow Entry exists for the traffic flow. If a Flow Entry exists and indicates that the network device originated or is handling the traffic flow, method 200 may end. Otherwise, if a Flow Entry for the traffic flow does not exist or if a Flow Entry indicates that a different network device originated or is handling the traffic flow, method 200 proceeds to step 240.

In step 240, method 200 determines a second network device that originated or is otherwise handling the traffic flow of step 210. In some embodiments, step 240 includes examining a Flow Entry in cache in order to determine the second network device. In other embodiments, step 240 includes sending a flow query message (e.g., flow query message 136) to all other network devices in the same tenancy (e.g., all other network device 130 in data center/computing cloud 120 that are handling the same tenant). If a flow query response message (e.g., flow query response message 138) is received from a particular network device, method 200 may determine in step 240 that the particular network device that sent the flow query response message originated or is otherwise currently holding onto the traffic flow. After step 240, method 200 proceeds to step 250.

In step 250, method 200 sends the handshake message of step 210 to the second network device determined in step 240 in order to maintain symmetry for the traffic flow of step 210. In some embodiments, the handshake message is sent across a GRE tunnel. After step 250, method 200 may end.

Figure 3:
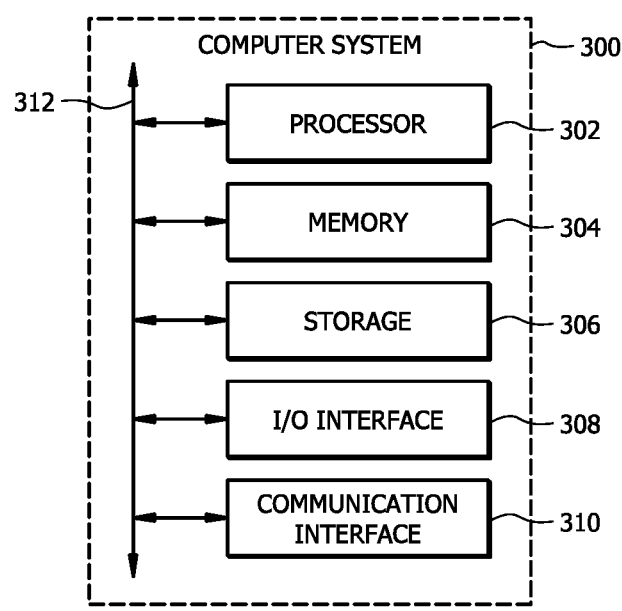
FIG. 3 illustrates an example of a computer system, in accordance with certain embodiments.

FIG. 3 illustrates an example computer system 300. In particular embodiments, one or more computer systems 300 perform one or more steps of one or more methods described or illustrated herein. In particular embodiments, one or more computer systems 300 provide functionality described or illustrated herein. In particular embodiments, software running on one or more computer systems 300 performs one or more steps of one or more methods described or illustrated herein or provides functionality described or illustrated herein. Particular embodiments include one or more portions of one or more computer systems 300. Herein, reference to a computer system may encompass a computing device, and vice versa, where appropriate. Moreover, reference to a computer system may encompass one or more computer systems, where appropriate.

This disclosure contemplates any suitable number of computer systems 300. This disclosure contemplates computer system 300 taking any suitable physical form. As example and not by way of limitation, computer system 300 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 300 may include one or more computer systems 300; be unitary or distributed; span multiple locations; span multiple machines; span multiple data centers; or reside in a cloud, which may include one or more cloud components in one or more networks. Where appropriate, one or more computer systems 300 may perform without substantial spatial or temporal limitation one or more steps of one or more methods described or illustrated herein. As an example and not by way of limitation, one or more computer systems 300 may perform in real time or in batch mode one or more steps of one or more methods described or illustrated herein. One or more computer systems 300 may perform at different times or at different locations one or more steps of one or more methods described or illustrated herein, where appropriate.

In particular embodiments, computer system 300 includes a processor 302, memory 304, storage 306, an input/output (I/O) interface 308, a communication interface 310, and a bus 312. Although this disclosure describes and illustrates a particular computer system having a particular number of particular components in a particular arrangement, this disclosure contemplates any suitable computer system having any suitable number of any suitable components in any suitable arrangement.

In particular embodiments, processor 302 includes hardware for executing instructions, such as those making up a computer program. As an example and not by way of limitation, to execute instructions, processor 302 may retrieve (or fetch) the instructions from an internal register, an internal cache, memory 304, or storage 306; decode and execute them; and then write one or more results to an internal register, an internal cache, memory 304, or storage 306. In particular embodiments, processor 302 may include one or more internal caches for data, instructions, or addresses. This disclosure contemplates processor 302 including any suitable number of any suitable internal caches, where appropriate. As an example and not by way of limitation, processor 302 may include one or more instruction caches, one or more data caches, and one or more translation lookaside buffers (TLBs). Instructions in the instruction caches may be copies of instructions in memory 304 or storage 306, and the instruction caches may speed up retrieval of those instructions by processor 302. Data in the data caches may be copies of data in memory 304 or storage 306 for instructions executing at processor 302 to operate on; the results of previous instructions executed at processor 302 for access by subsequent instructions executing at processor 302 or for writing to memory 304 or storage 306; or other suitable data. The data caches may speed up read or write operations by processor 302. The TLBs may speed up virtual-address translation for processor 302. In particular embodiments, processor 302 may include one or more internal registers for data, instructions, or addresses. This disclosure contemplates processor 302 including any suitable number of any suitable internal registers, where appropriate. Where appropriate, processor 302 may include one or more arithmetic logic units (ALUs); be a multi-core processor; or include one or more processors 302. Although this disclosure describes and illustrates a particular processor, this disclosure contemplates any suitable processor.

In particular embodiments, memory 304 includes main memory for storing instructions for processor 302 to execute or data for processor 302 to operate on. As an example and not by way of limitation, computer system 300 may load instructions from storage 306 or another source (such as, for example, another computer system 300) to memory 304. Processor 302 may then load the instructions from memory 304 to an internal register or internal cache. To execute the instructions, processor 302 may retrieve the instructions from the internal register or internal cache and decode them. During or after execution of the instructions, processor 302 may write one or more results (which may be intermediate or final results) to the internal register or internal cache. Processor 302 may then write one or more of those results to memory 304. In particular embodiments, processor 302 executes only instructions in one or more internal registers or internal caches or in memory 304 (as opposed to storage 306 or elsewhere) and operates only on data in one or more internal registers or internal caches or in memory 304 (as opposed to storage 306 or elsewhere). One or more memory buses (which may each include an address bus and a data bus) may couple processor 302 to memory 304. Bus 312 may include one or more memory buses, as described below. In particular embodiments, one or more memory management units (MMUs) reside between processor 302 and memory 304 and facilitate accesses to memory 304 requested by processor 302. In particular embodiments, memory 304 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 304 may include one or more memories 304, where appropriate. Although this disclosure describes and illustrates particular memory, this disclosure contemplates any suitable memory.

In particular embodiments, storage 306 includes mass storage for data or instructions. As an example and not by way of limitation, storage 306 may include a hard disk drive (HDD), a floppy disk drive, flash memory, an optical disc, a magneto-optical disc, magnetic tape, or a Universal Serial Bus (USB) drive or a combination of two or more of these. Storage 306 may include removable or non-removable (or fixed) media, where appropriate. Storage 306 may be internal or external to computer system 300, where appropriate. In particular embodiments, storage 306 is non-volatile, solid-state memory. In particular embodiments, storage 306 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 306 taking any suitable physical form. Storage 306 may include one or more storage control units facilitating communication between processor 302 and storage 306, where appropriate. Where appropriate, storage 306 may include one or more storages 306. Although this disclosure describes and illustrates particular storage, this disclosure contemplates any suitable storage.

In particular embodiments, I/O interface 308 includes hardware, software, or both, providing one or more interfaces for communication between computer system 300 and one or more I/O devices. Computer system 300 may include one or more of these I/O devices, where appropriate. One or more of these I/O devices may enable communication between a person and computer system 300. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 308 for them. Where appropriate, I/O interface 308 may include one or more device or software drivers enabling processor 302 to drive one or more of these I/O devices. I/O interface 308 may include one or more I/O interfaces 308, where appropriate. Although this disclosure describes and illustrates a particular I/O interface, this disclosure contemplates any suitable I/O interface.

In particular embodiments, communication interface 310 includes hardware, software, or both providing one or more interfaces for communication (such as, for example, packet-based communication) between computer system 300 and one or more other computer systems 300 or one or more networks. As an example and not by way of limitation, communication interface 310 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 310 for it. As an example and not by way of limitation, computer system 300 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 300 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a Long-Term Evolution (LTE) network, or a 5G network), or other suitable wireless network or a combination of two or more of these. Computer system 300 may include any suitable communication interface 310 for any of these networks, where appropriate. Communication interface 310 may include one or more communication interfaces 310, where appropriate. Although this disclosure describes and illustrates a particular communication interface, this disclosure contemplates any suitable communication interface.

In particular embodiments, bus 312 includes hardware, software, or both coupling components of computer system 300 to each other. As an example and not by way of limitation, bus 312 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 312 may include one or more buses 312, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The embodiments disclosed herein are only examples, and the scope of this disclosure is not limited to them. Particular embodiments may include all, some, or none of the components, elements, features, functions, operations, or steps of the embodiments disclosed herein. Certain embodiments are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The invention claimed is:

1. A network device comprising:
one or more processors; and
one or more computer-readable non-transitory storage media, the one or more computer-readable non-transitory storage media comprising instructions that, when executed by the one or more processors, cause one or more components of the network device to perform operations comprising:
 receiving a handshake message for a traffic flow from a Software-Defined Wide-Area Network (SDWAN);
 determining, from a traffic policy, whether the traffic flow should be symmetrical;
 in response to determining from the traffic policy that the traffic flow should be symmetrical, performing a flow lookup on the traffic flow to determine if the network device originated the traffic flow;
 in response to determining that the network device did not originate the traffic flow, determining a second network device that originated the traffic flow; and
 sending the handshake message for the traffic flow to the second network device in order to maintain symmetry for the traffic flow.

2. The network device of claim 1, wherein both the network device and the second network device are Multi-Tenant (MT) Gateways.

3. The network device of claim 1, wherein the handshake message comprises a Transmission Control Protocol (TCP) SYN-ACK message.

4. The network device of claim 1, wherein sending the handshake message for the traffic flow to the second network device comprises forwarding the handshake message across a Generic Routing Encapsulation (GRE) tunnel.

5. The network device of claim 1, wherein:
the traffic flow is for a tenant of a data center; and
determining the second network device that originated the traffic flow comprises:
 determining a plurality of other network devices assigned to the tenant, the plurality of other network devices comprising the second network device;
 sending a query message to each of the plurality of other network devices assigned to the tenant, the query message inquiring if a connection state exists for the traffic flow; and
 receiving a response message from the second network device, wherein the response message is sent by the second network device in response to receiving the query message.

6. The network device of claim 1, wherein:
the traffic flow is for a tenant of a data center; and
determining the second network device that originated the traffic flow comprises analyzing a plurality of flow messages sent by a plurality of other network devices assigned to the tenant, the plurality of other network devices comprising the second network device, the plurality of flow messages comprising:
 a flow-add message indicating that a particular traffic flow should be redirected in order to maintain symmetry;
 a flow-update message confirming that the particular traffic flow should continue to be redirected in order to maintain symmetry; and
 a flow-delete message indicating that the particular traffic flow should no longer be redirected in order to maintain symmetry.

7. The network device of claim 1, wherein:
the first and second network devices are located in a data center;
the traffic flow is for a tenant of the data center; and
the first and second network devices are both assigned to the tenant.

8. A method by a network device, the method comprising:
receiving a handshake message for a traffic flow from a Software-Defined Wide-Area Network (SDWAN);
determining, from a traffic policy, whether the traffic flow should be symmetrical;
in response to determining from the traffic policy that the traffic flow should be symmetrical, performing a flow lookup on the traffic flow to determine if the network device originated the traffic flow;
in response to determining that the network device did not originate the traffic flow, determining a second network device that originated the traffic flow; and
sending the handshake message for the traffic flow to the second network device in order to maintain symmetry for the traffic flow.

9. The method of claim 8, wherein both the network device and the second network device are Multi-Tenant (MT) Gateways.

10. The method of claim 8, wherein the handshake message comprises a Transmission Control Protocol (TCP) SYN-ACK message.

11. The method of claim 8, wherein sending the handshake message for the traffic flow to the second network device comprises forwarding the handshake message across a Generic Routing Encapsulation (GRE) tunnel.

12. The method of claim 8, wherein:
the traffic flow is for a tenant of a data center; and
determining the second network device that originated the traffic flow comprises:
  determining a plurality of other network devices assigned to the tenant, the plurality of other network devices comprising the second network device;
  sending a query message to each of the plurality of other network devices assigned to the tenant, the query message inquiring if a connection state exists for the traffic flow; and
  receiving a response message from the second network device, wherein the response message is sent by the second network device in response to receiving the query message.

13. The method of claim 8, wherein:
the traffic flow is for a tenant of a data center; and
determining the second network device that originated the traffic flow comprises analyzing a plurality of flow messages sent by a plurality of other network devices assigned to the tenant, the plurality of other network devices comprising the second network device, the plurality of flow messages comprising:
  a flow-add message indicating that a particular traffic flow should be redirected in order to maintain symmetry;
  a flow-update message confirming that the particular traffic flow should continue to be redirected in order to maintain symmetry; and
  a flow-delete message indicating that the particular traffic flow should no longer be redirected in order to maintain symmetry.

14. The method of claim 8, wherein:
the first and second network devices are located in a data center;
the traffic flow is for a tenant of the data center; and
the first and second network devices are both assigned to the tenant.

15. One or more computer-readable non-transitory storage media embodying instructions that, when executed by a processor of a router, cause the performance of operations comprising:
receiving a handshake message for a traffic flow from a Software-Defined Wide-Area Network (SDWAN);
determining, from a traffic policy, whether the traffic flow should be symmetrical;
in response to determining from the traffic policy that the traffic flow should be symmetrical, performing a flow lookup on the traffic flow to determine if the network device originated the traffic flow;
in response to determining that the network device did not originate the traffic flow, determining a second network device that originated the traffic flow; and
sending the handshake message for the traffic flow to the second network device in order to maintain symmetry for the traffic flow.

16. The one or more computer-readable non-transitory storage media of claim 15, wherein both the network device and the second network device are Multi-Tenant (MT) Gateways.

17. The one or more computer-readable non-transitory storage media of claim 15, wherein the handshake message comprises a Transmission Control Protocol (TCP) SYN-ACK message.

18. The one or more computer-readable non-transitory storage media of claim 15, wherein sending the handshake message for the traffic flow to the second network device comprises forwarding the handshake message across a Generic Routing Encapsulation (GRE) tunnel.

19. The one or more computer-readable non-transitory storage media of claim 15, wherein:
the traffic flow is for a tenant of a data center; and
determining the second network device that originated the traffic flow comprises:
  determining a plurality of other network devices assigned to the tenant, the plurality of other network devices comprising the second network device;
  sending a query message to each of the plurality of other network devices assigned to the tenant, the query message inquiring if a connection state exists for the traffic flow; and
  receiving a response message from the second network device, wherein the response message is sent by the second network device in response to receiving the query message.

20. The one or more computer-readable non-transitory storage media of claim 15, wherein:
the traffic flow is for a tenant of a data center; and
determining the second network device that originated the traffic flow comprises analyzing a plurality of flow messages sent by a plurality of other network devices assigned to the tenant, the plurality of other network devices comprising the second network device, the plurality of flow messages comprising:
  a flow-add message indicating that a particular traffic flow should be redirected in order to maintain symmetry;
  a flow-update message confirming that the particular traffic flow should continue to be redirected in order to maintain symmetry; and a flow-delete message indicating that the particular traffic flow should no longer be redirected in order to maintain symmetry.

\* \* \* \* \*